(12) United States Patent
Bren et al.

(10) Patent No.: US 11,505,354 B1
(45) Date of Patent: Nov. 22, 2022

(54) PACKAGING/INSPECTION SYSTEM FOR A NOZZLE PIVOT PACKAGE

(71) Applicant: NELSON IRRIGATION CORPORATION, Walla Walla, WA (US)

(72) Inventors: Theodore J. Bren, Walla Walla, WA (US); Craig B. Nelson, Walla Walla, WA (US); Paul D. Davisson, Walla Walla, WA (US)

(73) Assignee: NELSON IRRIGATION COPORATION, Walla Walla, WA (US)

( * ) Notice: Subject to any disclaimer, the term of this patent is extended or adjusted under 35 U.S.C. 154(b) by 69 days.

(21) Appl. No.: 17/170,016

(22) Filed: Feb. 8, 2021

Related U.S. Application Data

(60) Provisional application No. 62/978,427, filed on Feb. 19, 2020.

(51) Int. Cl.
*B65B 61/26* (2006.01)
*B65B 63/00* (2006.01)
*B65B 57/12* (2006.01)

(52) U.S. Cl.
CPC .............. *B65B 61/26* (2013.01); *B65B 57/12* (2013.01); *B65B 63/005* (2013.01)

(58) Field of Classification Search
CPC ....... B65B 63/005; B65B 57/12; B65B 67/02; B65B 67/00; B65B 61/28; B65B 61/26
See application file for complete search history.

(56) References Cited

U.S. PATENT DOCUMENTS

| 2,969,633 | A | * | 1/1961 | Archer ................... A21C 15/00 |
| | | | | 53/391 |
| 3,732,665 | A | | 5/1973 | Pitts |
| 6,975,922 | B2 | | 12/2005 | Duncan et al. |
| 7,796,799 | B2 | | 9/2010 | Jorritsma |
| 7,995,083 | B2 | | 8/2011 | Ackley, Jr. et al. |
| 8,146,331 | B2 | | 4/2012 | Soloman |

(Continued)

FOREIGN PATENT DOCUMENTS

| DE | 102017122764 | 9/2018 | |
| EP | 1705121 A2 * | 9/2006 | ............. B07C 5/16 |

OTHER PUBLICATIONS

Nannini Renato Automatic Nozzle Placing Machine with Semi-Automatic Packing Device Mod. MBECCS, retrieved on Jan. 6, 2020 from https://www.nanninirenato.com/en/nozzles-handling/antomatic-nozzle-placing-machine-with-semi-antomatie-packing-device-mod-mbeccs/, 5 pp.

*Primary Examiner* — Anna K Kinsaul
*Assistant Examiner* — Himchan Song
(74) *Attorney, Agent, or Firm* — Nixon & Vanderhye P.C.

(57) ABSTRACT

A packaging/inspection system is provided for a nozzle pivot package including a collection of nozzles in various nozzle sizes. The packaging/inspection system includes a shelf assembly with a plurality of compartments, an operator load track, a verification section downstream of the operator load track, a marking section downstream of the verification section, and an operator unload track downstream of the marking section. Each compartment may store nozzles of a specific nozzle size. Features of the shelf assembly alert the operator as to which compartment should be accessed and how many nozzles from the compartment are required.

16 Claims, 3 Drawing Sheets

(56) References Cited

U.S. PATENT DOCUMENTS

| | | |
|---|---|---|
| 8,373,081 B2 | 2/2013 | Ackley et al. |
| 8,499,531 B2 | 8/2013 | Benetti et al. |
| 8,914,146 B2 | 12/2014 | Carson et al. |
| 9,096,390 B2 | 8/2015 | Ackley |
| 9,637,249 B2 | 5/2017 | Hammacher |
| 9,758,303 B2 * | 9/2017 | Marquez .............. B65G 1/1373 |
| 10,669,098 B1 * | 6/2020 | Terzini ..................... B65B 5/08 |
| 2002/0087231 A1 | 7/2002 | Lewis et al. |
| 2010/0139222 A1 | 6/2010 | Federle et al. |
| 2012/0085071 A1 * | 4/2012 | Hahn ................. B29C 49/6436 |
| | | 53/425 |

* cited by examiner

PACKAGING/INSPECTION SYSTEM FOR A NOZZLE PIVOT PACKAGE

CROSS-REFERENCES TO RELATED APPLICATIONS

This application claims the benefit of U.S. Provisional Patent Application Ser. No. 62/978,427, filed Feb. 19, 2020, the entire content of which is herein incorporated by reference.

STATEMENT REGARDING FEDERALLY SPONSORED RESEARCH OR DEVELOPMENT (Not applicable)

BACKGROUND

The invention relates to systems for compiling and packaging sprinkler nozzles in a nozzle pivot package and, more particularly, to a packaging/inspection system for the nozzle pivot package that facilitates selection of sprinkler nozzles and marks the nozzles to aid in installation.

A center pivot is an automated irrigation system with a line of sprinklers rotating about a pivot point and supported by a series of self-propelled towers. Water is supplied at the pivot point and flows outward toward individual sprinklers. Each sprinkler includes a particularly-sized nozzle that controls volume, distribution pattern and droplet size at each sprinkler along the center pivot. A sprinkler package or nozzle pivot package refers to the group of sprinklers/nozzles installed on the center pivot. Sprinklers may be mounted above the pivot pipeline, on the side of the pipeline or suspended on drop tubes below the pipeline.

Due to the radial distribution of water and the increase in the number of acres irrigated per foot, each additional foot of the irrigation pipeline must be supplied with a greater amount of water. Consequently, the water application rate of the center pivot system increases in relation to the distance from the pivot point.

The nozzle pivot package includes all the nozzles required for the center pivot system. Existing packaging configurations include large racks that support various nozzles, which are gravity fed as nozzles are removed. The operator retrieves nozzles from the racks and manually verifies the nozzle size. The nozzles are organized into trays or the like for subsequent installation to the center pivot.

Although there is existing software to assist users in identifying how many of each size nozzle is required for a complete nozzle pivot package, the manual selection of nozzle sizes is burdensome and typically lacks secondary verification. Additionally, the large racks supporting the nozzles for operator selection are awkward and occupy too much floor space.

SUMMARY

It would thus be desirable to facilitate the selection or compiling process for a nozzle pivot package. The system of the described embodiments includes a carousel with a plurality of compartments, where each compartment stores nozzles of a specific nozzle size. Features of the carousel alert the operator as to which compartment should be accessed and how many nozzles from the compartment are required. Selected nozzles are loaded onto an operator load track and are subsequently moved into an indexing mechanism. The nozzles are indexed from the operator load track to a verification section that verifies the correct nozzle size. The nozzles are then indexed to a marking section that marks the nozzles with the pivot outlet location. Subsequently, the nozzles exit the indexing mechanism into an operator unload track from which they are packaged for installation into the center pivot.

In an exemplary embodiment, a packaging/inspection system for a nozzle pivot package includes a shelf assembly with a plurality of compartments, an operator load track, a verification section downstream of the operator load track, a marking section downstream of the verification section, and an operator unload track downstream of the marking section.

The shelf assembly may include a carousel. The carousel may include a plurality of stacked trays, and each of the stacked trays may include the plurality of compartments. The carousel may be rotatable.

The nozzle pivot package may include a predefined number of nozzles, where the verification section may be configured to identify a nozzle size of the nozzles. In this context, the verification section may include a camera and an image processor. The verification section may include an optic sensor coupled with a counter. The verification section may include a count display.

In some embodiments, the nozzle pivot package may include a predefined number N of nozzles, where the marking section may be configured to mark the nozzles consecutively from 1 to N until completing the pivot package. The marking section may include a laser marker.

The packaging/inspection system may additionally include an indexing mechanism downstream of the operator load track that is configured to transfer the nozzles among the operator load track, the verification section, the marking section, and the operator unload track. In this context, the indexing mechanism may be configured for three-nozzle synchronized displacement.

In another exemplary embodiment, a packaging/inspection system for a nozzle pivot package includes a carousel with a plurality of stacked trays, where each of the stacked trays has a plurality of compartments, an operator load track, a verification section downstream of the operator load track, a marking section downstream of the verification section, an operator unload track downstream of the marking section, and an indexing mechanism cooperable with the operator load track, the verification section, the marking section and the operator unload track. The indexing mechanism is configured to transfer the nozzles from the operator load track, then to the verification section, then to the marking section, and then to the operator unload track.

In yet another exemplary embodiment, a method of processing and compiling a nozzle pivot package including a collection of nozzles in various nozzle sizes includes the steps of (a) storing the collection of nozzles in a plurality of compartments; (b) retrieving a preset number of nozzles from the collection of nozzles, and loading the nozzles onto an operator load track; (c) inspecting each of the nozzles to verify a correct nozzle size; (d) marking each of the nozzles consecutively; and (e) unloading the nozzles onto an operator unload track. Step (b) may be practiced by (b1) retrieving one preset number of nozzles of one size, and (b2) after practicing steps (c), (d) and (e), retrieving another preset number of nozzles of a different size. The method may further include repeating steps (b1) and (b2) until all nozzles in the nozzle pivot package have been processed and compiled.

BRIEF DESCRIPTION OF THE DRAWINGS

These and other aspects and advantages will be described in detail with reference to the accompanying drawings, in which.

DETAILED DESCRIPTION

With reference to the drawings, a shelf assembly in the form of a carousel 12 is provided with a plurality of compartments 14, where each compartment 14 houses a collection of nozzles of the same nozzle size. The carousel 12 is rotatable manually by the operator to facilitate access to each of the compartments 14.

Figure 1:
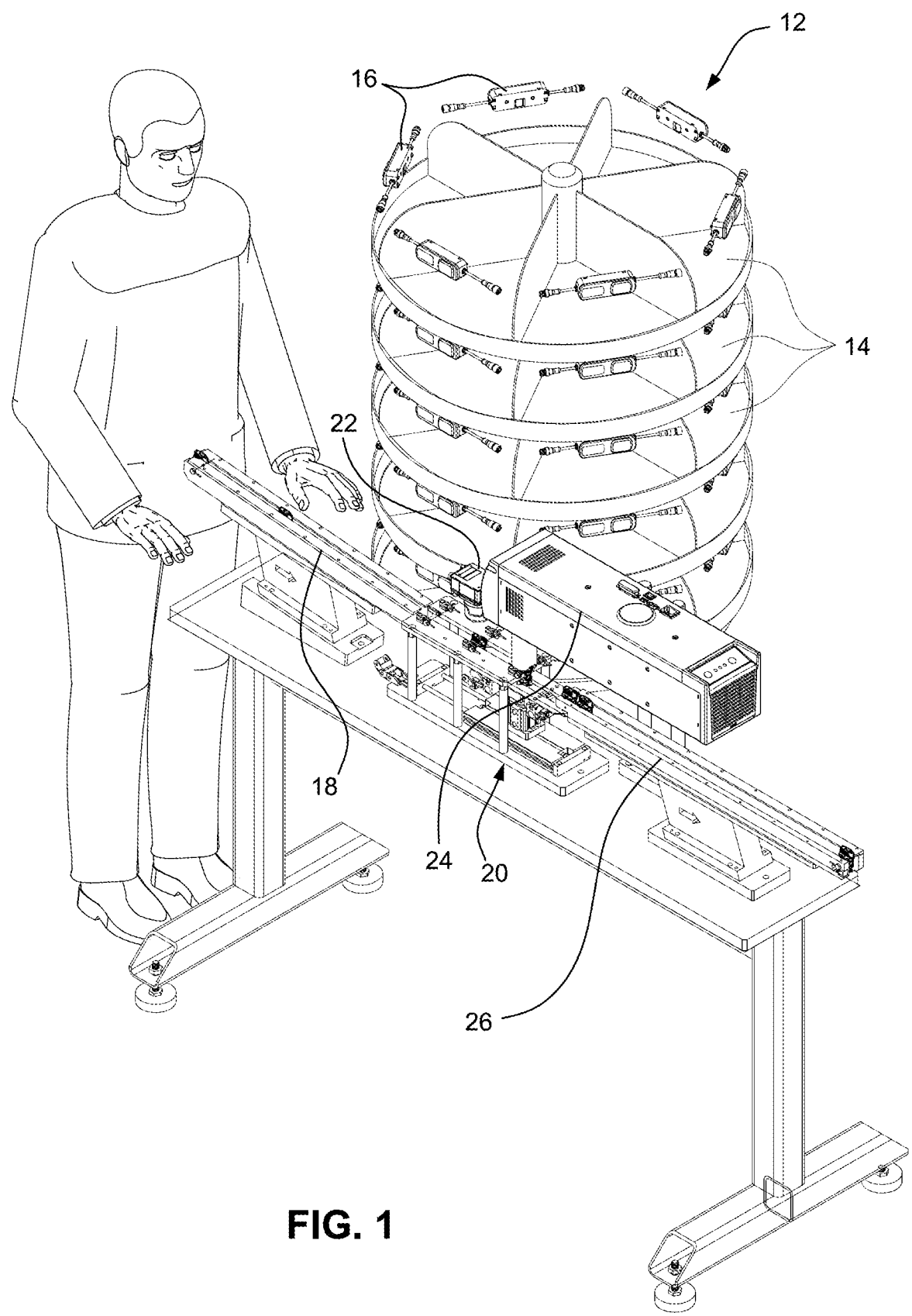
FIG. 1 is a perspective view of the packaging/inspection system.
Figure 2:
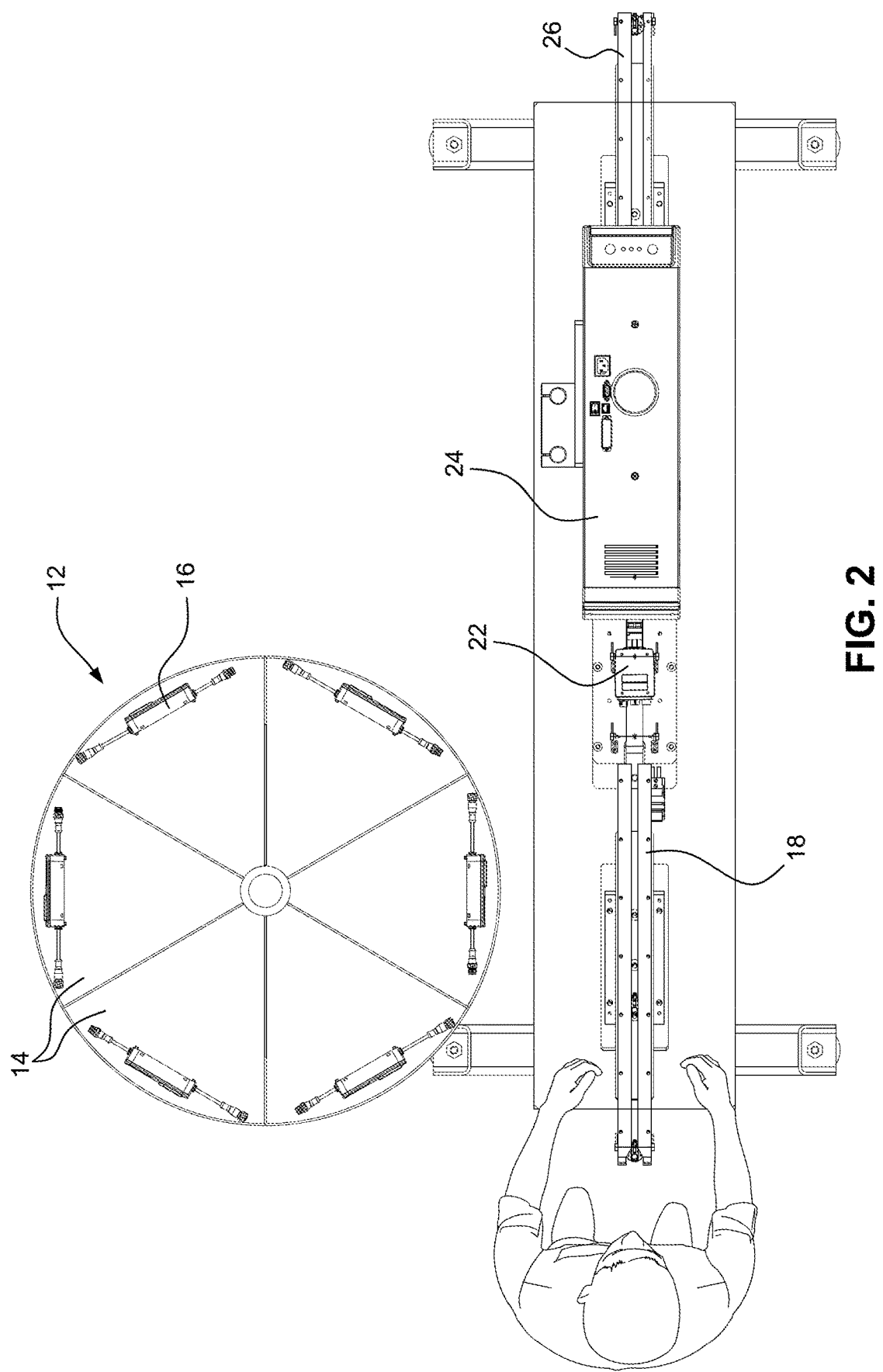
FIG. 2 is a plan view thereof.
Figure 3:
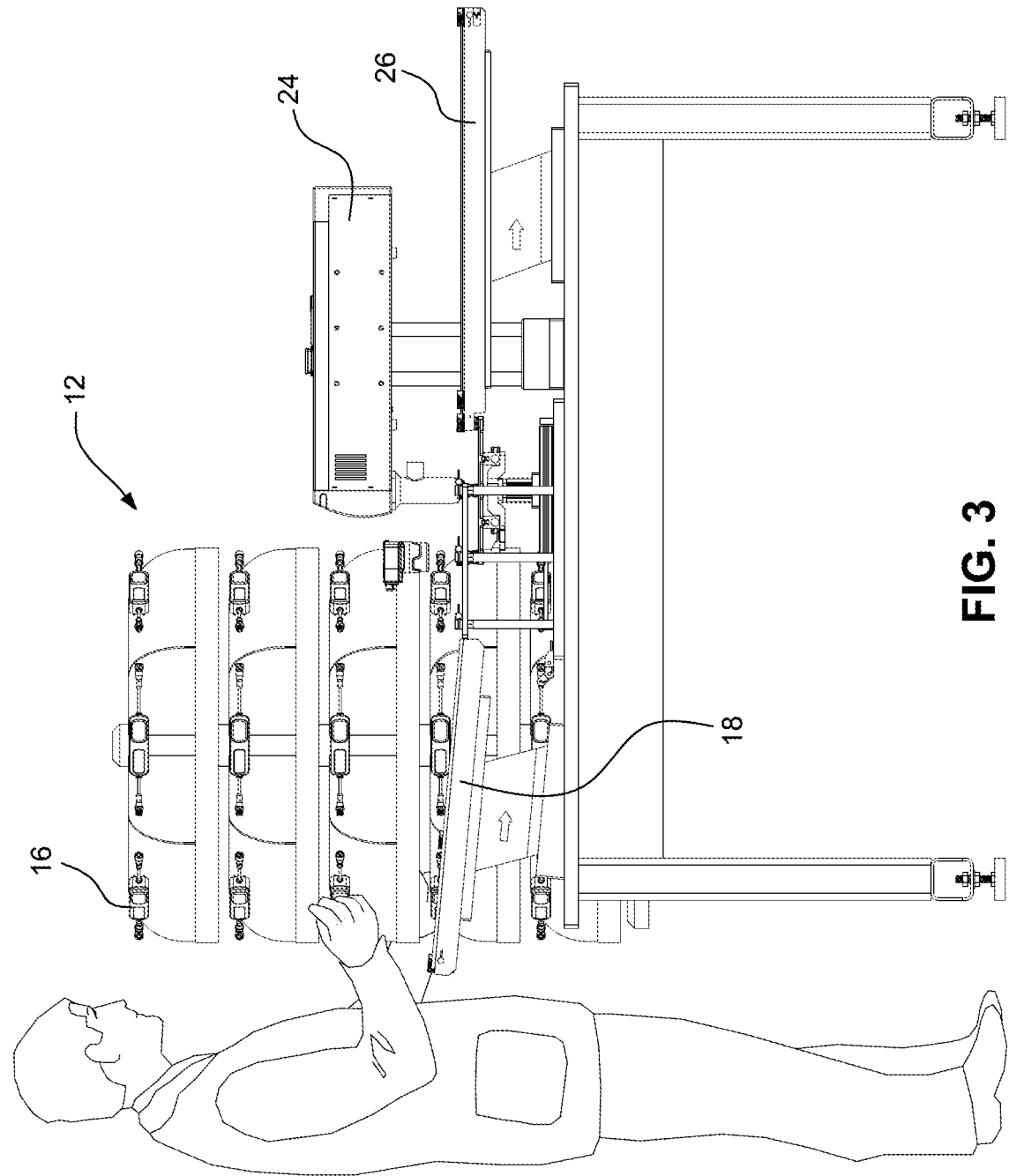
FIG. 3 is a side view thereof.

The nozzles in the compartments 14 may be arranged using logic sequencing to facilitate installation and to limit the amount of carousel rotation required by the user. For example, the exemplary carousel 12 shown in FIG. 1 includes five stacked trays, each with six compartments 14. In some embodiments, the carousel may include more or fewer trays. The nozzles in the compartments 14 may be arranged with the smallest nozzle size in the top compartment and incrementally larger nozzle sizes in aligned compartments of the trays. In this example, the order of nozzle selection would be from the top tray to the bottom tray of the carousel in the aligned compartments 14. After picking nozzles from the bottom tray, the carousel 12 can be rotated by one compartment with the next larger nozzle size in the top tray of the next column. In this manner, the operator would only be required to rotate the carousel 12 by an amount slightly less than 360 degrees.

The six compartments 14 in each of the five trays can thus accommodate 30 different nozzle sizes. Some pivot packages may include as many as 45 or more different nozzle sizes, in which case the carousel 12 may include additional trays, or each tray may include additional compartments 14, or a second carousel 12 may be included.

Each compartment 14 is provided with an indicator 16 including a pick light and a nozzle count LED display. The known pivot packaging software determines the required nozzle size and quantity. Exemplary known software is WinCHART, developed by the assignee, Nelson Irrigation Corporation in Walla Walla, Wash. This data is used to activate the appropriate pick light and display the nozzle quantity required. The operator then picks from the lighted compartment 14 and loads the nozzles onto an operator load track 18.

In some embodiments, the shelf assembly may be in the form of straight shelves in place of the rotating carousel 12. The straight shelves arranged vertically would have compartments separated horizontally across each shelf.

The operator load track 18 acts as a buffer or cache that receives the nozzles picked by the operator from the appropriate compartment 14. The nozzles are displaced along the operator load track 18 in any suitable manner including, for example, a belt system, friction drive, vibratory in-line feeder, or the like. At the end of the operator load track, each nozzle moves into an indexing mechanism 20 where the nozzle is more accurately positioned.

In some embodiments, the indexing mechanism 20 is configured for three-nozzle synchronized displacement. That is, the nozzles from the operator load track 18 are indexed three at a time to three separate stations (described in more detail below). The indexing mechanism 20 may be in the form of a pneumatic slider with grippers that secure the nozzles and create a walking beam. Horizontal or vertical grippers can secure the nozzle, lift the nozzle and/or transfer the nozzle between the stations. Pneumatic sliders with grippers may raise the nozzles approximately 0.25", and each index is approximately 4". If additional stations are required, the indexing mechanism 20 could be modified to accommodate additional nozzles for synchronized displacement. Other suitable mechanisms for the indexing mechanism 20 could include servo motors, stepper motors, linear actuators or the like.

As each nozzle is indexed from the operator load track 18 to the indexing mechanism 20, each nozzle is indexed to a verification section 22 downstream of the operator load track 18. In some embodiments, the verification section 22 includes an inspection camera that verifies the nozzle size. If the nozzle size is incorrect, the system will stop and alert the operator.

After each nozzle is correctly verified, the nozzle is indexed by the indexing mechanism 20 to the next position. The verification section 22 may also include an optic sensor or gate sensor on or near the operator load track 18 including a counter and counter display. Nozzle counting may be performed in real time using the optic or gate sensor at the inlet of the operator load track 18. The inspection camera verifies the correct nozzle size according to what the software is looking for.

In cooperation with the pivot packaging software, the system knows how many of each nozzle size should be included in the nozzle pivot package. The counter display is preferably visible to the operator, and the program may subtract from the counter display as each nozzle is verified.

When the nozzle count for each nozzle size is satisfied, the pick light on the indicator 16 may go into a flashing mode, and the counter on the indicator 16 may display zero. The operator can then return any extra nozzles of that nozzle size back into the flashing lighted compartment. Subsequently, the operator can push a confirm push button to allow the program to disable the last nozzle flashing light and activate the light on the indicator 16 for the next nozzle size to be picked.

The nozzles are indexed to a marking section 24 downstream of the verification section 22. In some embodiments, the marking section 24 includes a laser marker or the like such as a $CO_2$ laser marker. The marking section 24 marks each nozzle from 1 to N, where N is the total number of nozzles in the nozzle pivot package. The nozzles are marked consecutively. In some embodiments, the nozzles are marked from smallest to largest, representing nozzles adjacent the center pivot to nozzles farthest from the center pivot. For example, the nozzle closest the center pivot would be marked #1, with nozzles marked consecutively to #N.

A nozzle package could include 200 or more nozzles. In some configurations, the nozzles may include 30 or more each of a single nozzle size. The nozzles are numbered consecutively to facilitate packaging and installation.

After the marking section 24, the nozzles are indexed via the indexing mechanism 20 to an operator unload track 26. From the operator unload track 26, the nozzles can be unloaded as they come out and inserted into a sprinkler assembly or be compiled in order in a box for subsequent installation. A string or rod can be threaded through the sprinklers to maintain the installation order.

The system can be networked to a computer that is running the WinCHART software, which in turn will dump the necessary pivot package nozzle data into a control circuit (PLC) mounted on the machine. The PLC will be programmed to control all logic necessary to build the nozzle pivot package according to the received data dump from the computer. This logic will manage all the components such as HMI, pick lights, counters, laser, camera, feed track controls, pneumatic valves, optic sensors, position switches, etc. The HMI will display all pertinent info such as alarms, machine status, etc.

Once the nozzles are picked by the operator, the system is substantially autonomous, and with the operator load track 18 sized to receive 12-24 nozzles, the entire operation can be implemented by a single operator. The system facilitates packaging and compiling of a complete nozzle pivot package.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A packaging/inspection system for a nozzle pivot package including a collection of nozzles in various nozzle sizes, the packaging/inspection system comprising:
a shelf assembly with a plurality of compartments;
an operator load track;
a verification section downstream of the operator load track;
a marking section downstream of the verification section; and
an operator unload track downstream of the marking section,
wherein the nozzle pivot package includes a predefined number of nozzles, and wherein the verification section is configured to identify a nozzle size of the nozzles.

2. The packaging/inspection system according to claim 1, wherein the shelf assembly comprises a carousel.

3. The packaging/inspection system according to claim 2, wherein the carousel comprises a plurality of stacked trays, and wherein each of the stacked trays includes the plurality of compartments.

4. The packaging/inspection system according to claim 3, wherein the carousel is rotatable.

5. The packaging/inspection system according to claim 1, wherein the verification section comprises a camera and an image processor.

6. The packaging/inspection system according to claim 5, wherein the verification section comprises an optic sensor coupled with a counter.

7. The packaging/inspection system according to claim 6, wherein the verification section comprises a count display.

8. The packaging/inspection system according to claim 1, wherein the marking section comprises a laser marker.

9. The packaging/inspection system according to claim 1, further comprising an indexing mechanism downstream of the operator load track, the indexing mechanism being configured to transfer the nozzles among the operator load track, the verification section, the marking section, and the operator unload track.

10. The packaging/inspection system according to claim 9, wherein the indexing mechanism is configured for three-nozzle synchronized displacement.

11. A packaging/inspection system for a nozzle pivot package including a collection of nozzles in various nozzle sizes, the packaging/inspection system comprising:
a shelf assembly with a plurality of compartments;
an operator load track;
a verification section downstream of the operator load track;
a marking section downstream of the verification section; and
an operator unload track downstream of the marking section,
wherein the nozzle pivot package includes a predefined number N of nozzles, and wherein the marking section is configured to mark the nozzles consecutively from 1 to N until completing the pivot package.

12. A packaging/inspection system for a nozzle pivot package including a collection of nozzles in various nozzle sizes, the packaging/inspection system comprising:
a carousel with a plurality of stacked trays, each of the stacked trays including a plurality of compartments;
an operator load track;
a verification section downstream of the operator load track;
a marking section downstream of the verification section;
an operator unload track downstream of the marking section; and
an indexing mechanism cooperable with the operator load track, the verification section, the marking section and the operator unload track, the indexing mechanism being configured to transfer the nozzles from the operator load track, then to the verification section, then to the marking section, and then to the operator unload track,
wherein the nozzle pivot package includes a predefined number of nozzles, and wherein the verification section is configured to identify a nozzle size of the nozzles.

13. The packaging/inspection system according to claim 12, wherein the verification section comprises a camera and an image processor.

14. The packaging/inspection system according to claim 13, wherein the verification section comprises an optic sensor coupled with a counter.

15. The packaging/inspection system according to claim 14, wherein the verification section comprises a count display.

16. The packaging/inspection system according to claim 12, wherein the marking section comprises a laser marker.

* * * * *